United States Patent
von Ahn Arellano et al.

(10) Patent No.: US 7,478,110 B2
(45) Date of Patent: Jan. 13, 2009

(54) GAME-POWERED SEARCH ENGINE

(75) Inventors: Luis A. von Ahn Arellano, Pittsburgh, PA (US); Eric D. Brill, Redmond, WA (US); John C. Platt, Redmond, WA (US); Josh Benaloh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 428 days.

(21) Appl. No.: 11/041,557

(22) Filed: Jan. 24, 2005

(65) Prior Publication Data
US 2006/0167874 A1 Jul. 27, 2006

(51) Int. Cl.
*G06F 17/30* (2006.01)
(52) U.S. Cl. .................. 707/104.1; 707/10; 463/9
(58) Field of Classification Search ........... 463/9; 707/3, 10, 102, 104.1, E17.015
See application file for complete search history.

(56) References Cited

U.S. PATENT DOCUMENTS

| | | | |
|---|---|---|---|
| 4,363,482 A * | 12/1982 | Goldfarb | 463/9 |
| 6,093,100 A * | 7/2000 | Singer et al. | 463/13 |
| 6,131,085 A * | 10/2000 | Rossides | 705/1 |
| 6,270,405 B1 * | 8/2001 | Ferguson | 463/13 |
| 6,453,299 B1 * | 9/2002 | Wendkos | 705/14 |
| 6,671,681 B1 * | 12/2003 | Emens et al. | 707/5 |
| 6,856,986 B1 * | 2/2005 | Rossides | 707/1 |
| 7,089,226 B1 * | 8/2006 | Dumais et al. | 707/3 |
| 2002/0105144 A1* | 8/2002 | Tait et al. | 273/292 |
| 2002/0108125 A1* | 8/2002 | Joao | 725/139 |
| 2002/0142842 A1* | 10/2002 | Easley et al. | 463/42 |
| 2002/0155879 A1* | 10/2002 | Walker et al. | 463/20 |
| 2004/0044516 A1* | 3/2004 | Kennewick et al. | 704/5 |
| 2004/0063081 A1* | 4/2004 | Lipkins | 434/236 |
| 2004/0127284 A1* | 7/2004 | Walker et al. | 463/30 |
| 2005/0266907 A1* | 12/2005 | Weston et al. | 463/1 |

* cited by examiner

*Primary Examiner*—Leslie Wong
(74) *Attorney, Agent, or Firm*—Amin, Turocy & Calvin, LLP

(57) ABSTRACT

The subject invention provides a unique system and method that facilitates an interactive game-powered search engine that serve the purposes of both users who may be looking for information as well as game participants who may desire to earn some reward or level of enjoyment by playing the game. More specifically, the system and method provides feedback to a user based on the user's input string or a string derived therefrom. The feedback can be a response or answer to the user's input in the form of text, an image, audio or sound, video, and/or a URL that is provided by one or more game participants when there is some degree of consistency or agreement between the responses or when individual players have demonstrated good reliability in their responses.

20 Claims, 8 Drawing Sheets

GAME-POWERED SEARCH ENGINE

TECHNICAL FIELD

The subject invention relates generally to online searching and in particular to providing responses to user-initiated requests or queries via game participants.

BACKGROUND OF THE INVENTION

The World Wide Web has become a popular reference tool to search for information due to its large collection of documents. However, finding information in such a large document collection can often be a challenging and time-consuming task. For example, a user must decide which search engine to use and how to best phrase his/her search request. To verify the results, some users may even repeat the search using slightly different words or changing the order of the words. More and more, looking for the desired information can be rather cumbersome. In addition, the abilities of search engine users can vary immensely. For instance, information that might take one user a few seconds to find may take several minutes or be impossible for another user to find.

Coincident with some of these concerns, numerous systems have been built for community question answering. Examples of these conventional systems include Usenet newsgroups where a user posts a question to a particular topic group and persons or people who monitor that group individually respond to the question. Google Answers is similar except that user offers to pay money to have their questions answered. Naver, a Korean search engine, even offers points for those who individually answer a question posted by another user. The systems currently in operation do provide answers for users, however, the integrity or accuracy of the answer may not or cannot be checked or known, and often the user is still left with the task of determining the right answer. Another problem with these systems is that the throughput is limited because a relatively small number of people participate in providing answers.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to a system and/or methodology that facilitates an interactive game-powered search engine which can benefit both users looking for information as well as game participants desiring to earn some reward. More specifically, the system and method provides feedback to a user based on the user's input string or a string derived therefrom. The feedback can be a response or answer to the user's input in the form of text, an image, audio or sound, video, and/or a URL that is provided by one or more game participants when there is some level of agreement or consistency between the responses or when individual players have demonstrated good reliability in their responses.

According to one aspect of the invention, a user can input a search request or query into a game-powered search system. The system then communicates the search request or query to a plurality of game participants. As part of the gaming experience, participants can be incentivized to respond to user queries in order to earn a reward such as points, accolades, prizes, and/or money. When at least two responses to a user's query are received, a determination as to whether there is agreement among the responses can be made as a way to find the best or most accurate information for the user.

Agreement or consistency among responses can be determined by exact or near-exact matching of the responses as well as by resolving the use of synonyms, slang, and/or other related words or phrases. In some instances, however, participant responses for a given search request or query may not satisfy a threshold. This can be due to varying opinions or experience of the participants or a mere disagreement between the participants. When this occurs, the system can return a listing of the top 2 or 3 or more responses along with the computed probability of each to allow the user the opportunity to view the most common responses given. Alternatively, no response may be returned and the user can be notified that his/her request or query remains under consideration by the participants.

In addition, a probability can be computed to ascertain the likelihood that any one response is more likely the best response. When the probability of any one response satisfies a threshold, the appropriate response can be returned to the user. Meanwhile, the participant or participants who provided the returned response can be rewarded for their participation.

In another aspect, players could play a knowledge testing game in which some or perhaps almost all questions are test queries that have answers already known by the game. Additional queries from users could be fed into this game, and answers supplied by those who have answered test queries well could be returned.

According to another aspect, specific game participants having a specialized expertise or knowledge base can be selected to respond to requests or queries depending upon their subject matter. Furthermore, participants can also be rewarded based on the number of user click-throughs such as when a user actually clicks on a URL provided in the response.

According to yet another aspect of the invention, a filter component can be employed to guard against inappropriate search requests. In particular, a system owner can activate the filter component to block specific word or phrases from being entered as a search request or query by any user of the system. When a search request or query is denied due to inappropriate content, the user can be notified immediately. A log of such requests or queries can also be maintained by the system if desired by the system owner.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
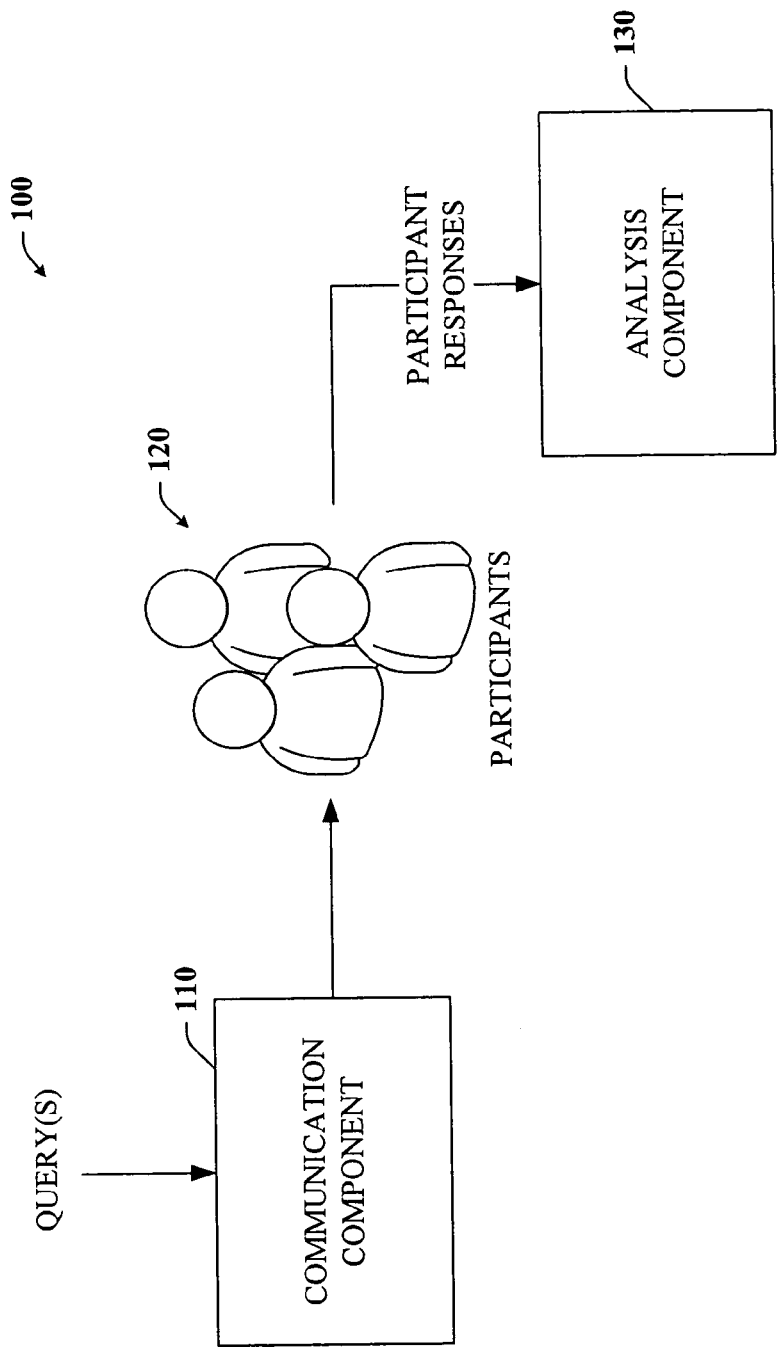
FIG. 1 is a high-level block diagram of a game-powered search system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with determining whether at least a subset of participants have provided a consistent response or answer to a given user request or query. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Also used herein are the terms query and response. A query can include a character string in the form of a question, statement, request, phrase, one or more characters, single word, and/or multiple word combination. A response can include a statement, phrase, word, and/or word combination in text or as audio. Images, video, and URLs can also be included in whole or in part in the response.

Referring now to FIG. 1, there is a high-level block diagram of a game-powered search system 100 in accordance with an aspect of the subject invention. The system 100 includes a communication component 110 that communicates one or more queries to a plurality of participants 120 to elicit a response from at least a subset of the participants to the queries. The one or more queries can be initiated by at least one user seeking information, advice, instruction, or the like.

When at least a subset of the participants has submitted a response, an analysis component 130 can determine whether the responses are suitable. For example, the analysis component 130 can compare multiple responses for consistency. It can also evaluate the plausibility of a response based upon the accuracy of prior responses provided by that individual.

To increase the accuracy of this heuristic, the analysis component 130 can determine what portion of participants who responded to the query provided the same or consistent responses. This heuristic can also be improved by weighting responses based upon the quality of prior responses submitted by each individual. The consistency of answers can be employed as an approximation for the probability of a response being correct. When the probability for at least one response satisfies a threshold, then the response can be returned to the user.

In most cases, one response is sufficient to return to the user; however, more than one response can be returned to the user when any underlying conditions (e.g., threshold, user preferences, etc.) are satisfied. A graduated threshold level can also be utilized as desired by the user or system owner. For example, the user can program higher threshold levels to be used when more than one response satisfies the primary or default threshold.

In practice, the system 100 can be deployed at an online game site and as a result, a constant population of participants actively being presented with queries can be had. As more and more responses are returned to users, a database of queries and their (returned) responses can be built and stored. Thus, when any of these queries are presented again, the corresponding response can be provided.

Figure 2:
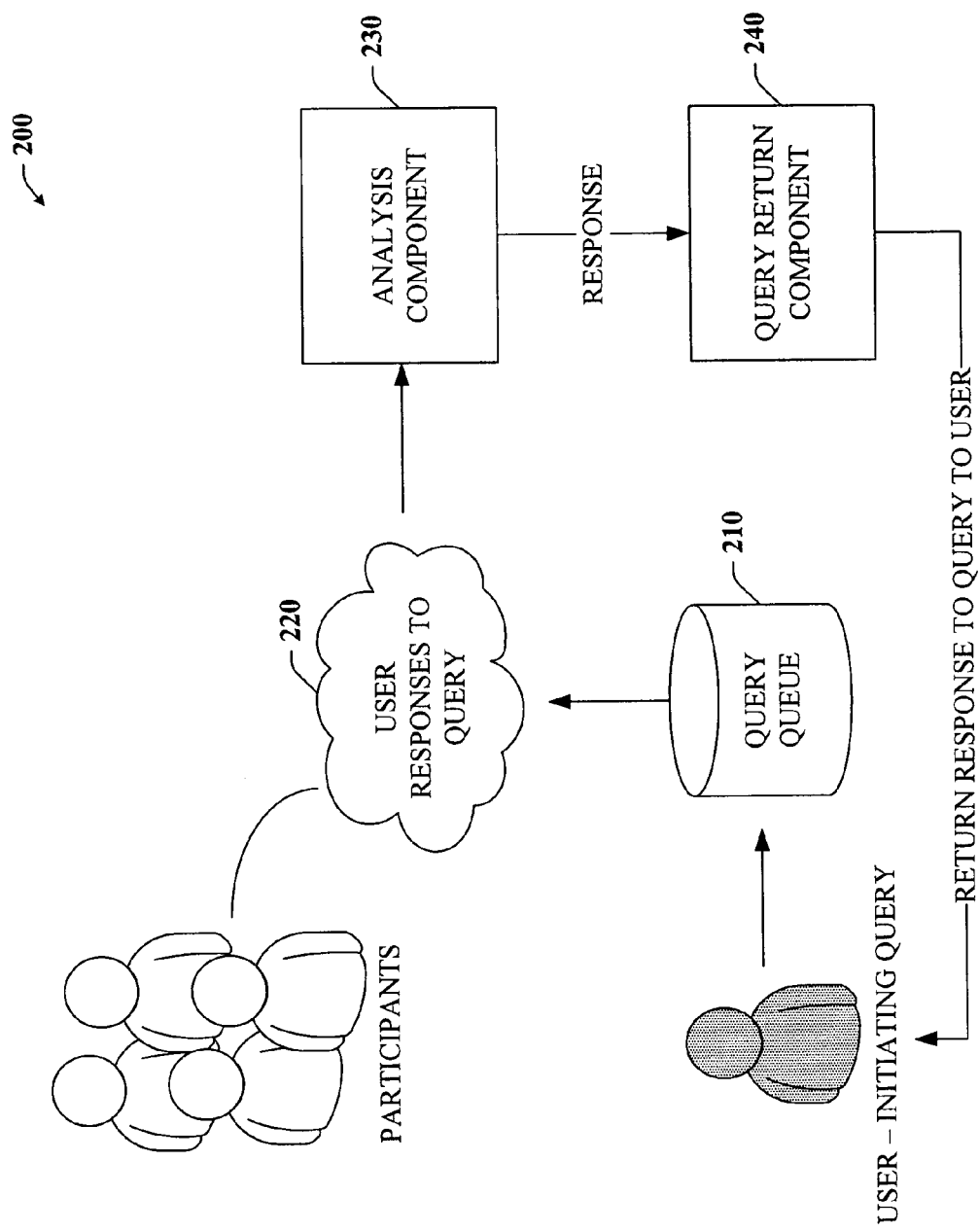
FIG. 2 is a block diagram of a game-powered search system in accordance with an aspect of the subject invention.

Referring now to FIG. 2, there is a general block diagram of a game-powered search system 200 in accordance with an aspect of the subject invention. The system 200 includes a query queue 210 that can receive and store user-initiated queries. The query queue communicates each appropriate query to a plurality of participants. When responses 220 to the query from at least a subset of the participants (e.g., at least two) are received, they can be sent to an analysis component 230.

The analysis component 230 can perform one or more heuristics to increase the accuracy of the response returned to the user. For example, the analysis component can examine the responses for consistency and/or similarity in addition to whether they are identical to each other. The analysis component 230 can also resolve slang terms or phrases in responses as well as different languages. That is, the analysis component 230 can include a translation component (not shown) to translate responses into their appropriate language as determined by the user.

Once the analysis component 230 determines that one response from those submitted by the participants is the most appropriate and accurate given the initial query, the analysis component 230 can communicate the response to a query return component 240. The query return component 240 can return the response to the user.

It should be appreciated that a user can specify an amount of time in which he/she would like a response returned. If no response is returned to the user within the specified time, a message can be returned, notifying the user that a response was not available within the preferred time period. At that time, the user can choose to continue with or abort the query.

Due to the game nature of the system 200, the participants whose response is ultimately returned to the user can be rewarded the appropriate incentive or prize (e.g., points, coupons, money, praises, etc.). In addition, participants providing the "right" response faster than others who respond to the same query can be given an additional reward. The rate at which a participant "accurately" responds to queries can also increase the number or amount of rewards given to a participant.

Though not shown, the system 200 can also include a monitoring component that can monitor the user's behavior with respect to the returned response. For example, a URL may be the most appropriate response to the user's query. Thus, the monitoring component can detect whether the user actually clicks on the URL. Doing so can translate to additional rewards to the participants who provided it.

Figure 3:
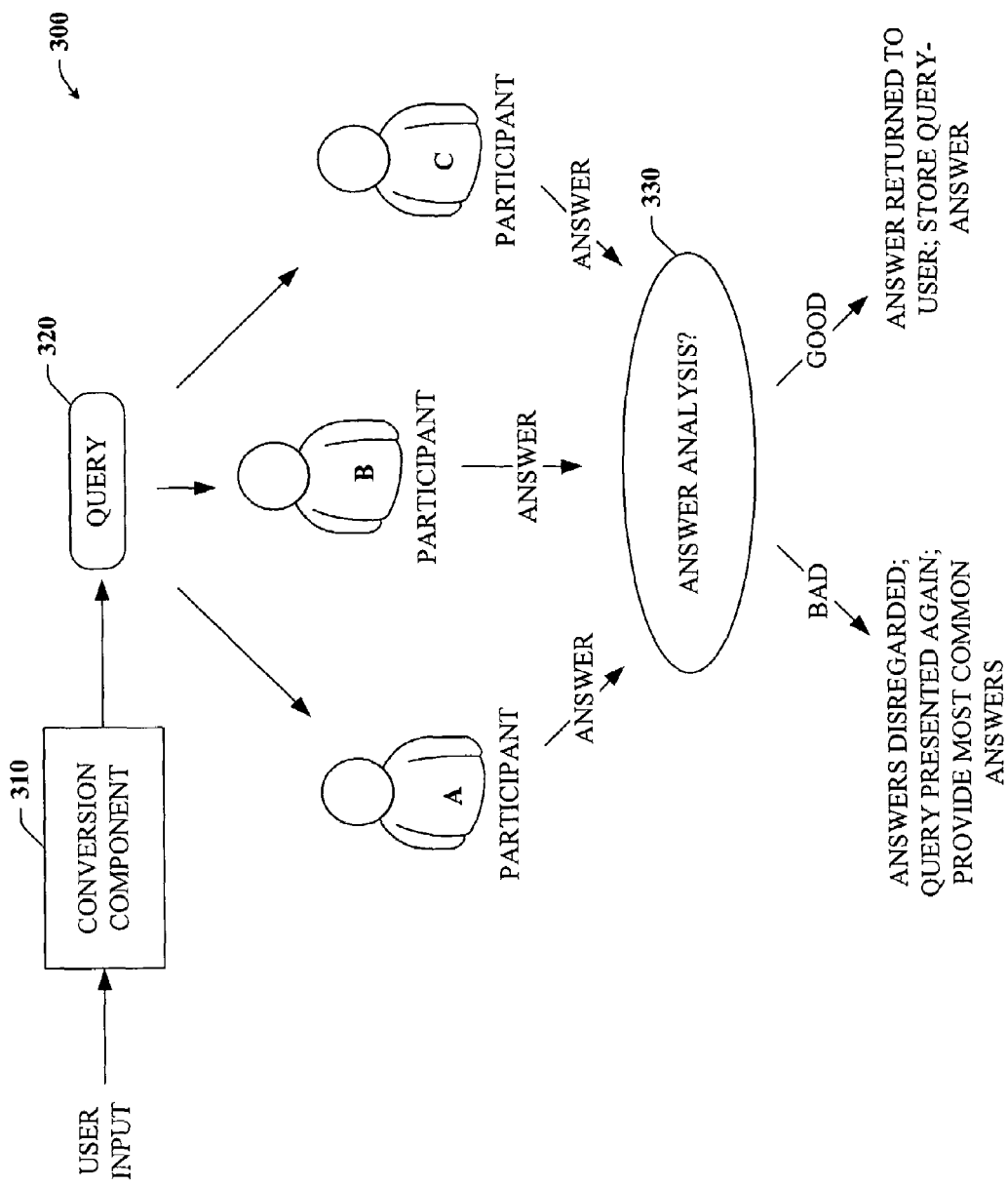
FIG. 3 is a block diagram of a game-powered search system in accordance with an aspect of the subject invention.

Turning now to FIG. 3, there is a schematic diagram of a multi-player game-powered information retrieval system 300 in accordance with an aspect of the subject invention. The system 300 can include a conversion component 310 that receives user input (e.g., character string) and converts it to a suitable query 320. For example, the user may enter "Brittany Spears' birthday". The conversion component 310 can convert this input into a query such as "When was Brittany Spears born?". The query 320 can then be sent to any plurality of participants (e.g., A, B, and C).

Alternatively, the query 320 can be parsed for its content and then categorized. In this case, the category may be music artists or singers. The participants A, B, C, for example, can be located in a general pool of participants or can be divided into specialized groups that possess exceptional knowledge of certain topics. Thus, the query 320 can be sent to the general pool of participants and/or to a music artists group. It may also be possible for the user to determine to which group or groups his/her query is made available.

The participants' answers are collected and examined 330. This examination may consist of comparing the answers for consistency and/or determining the plausibility of each individual's answer based on past performance, syntactic or semantic inspection of the submitted answer, and other characteristics of the submitted answer.

Many, perhaps even the vast majority of the queries given to players may be pre-selected test questions for which the correct responses are already known. This enables the analysis system 330 to better determine the past performance of each individual while ensuring more consistent and enjoyable game play.

When no suitable answer exists, the provided answers can be disregarded and the user can be notified that no suitable answer was received by the participants. The query can also be saved and resubmitted. Alternatively, the most common answers (e.g., top 3, 4, 5, etc. answers) submitted can be shown to the user along with each answer's probability of being the most accurate.

Figure 4:
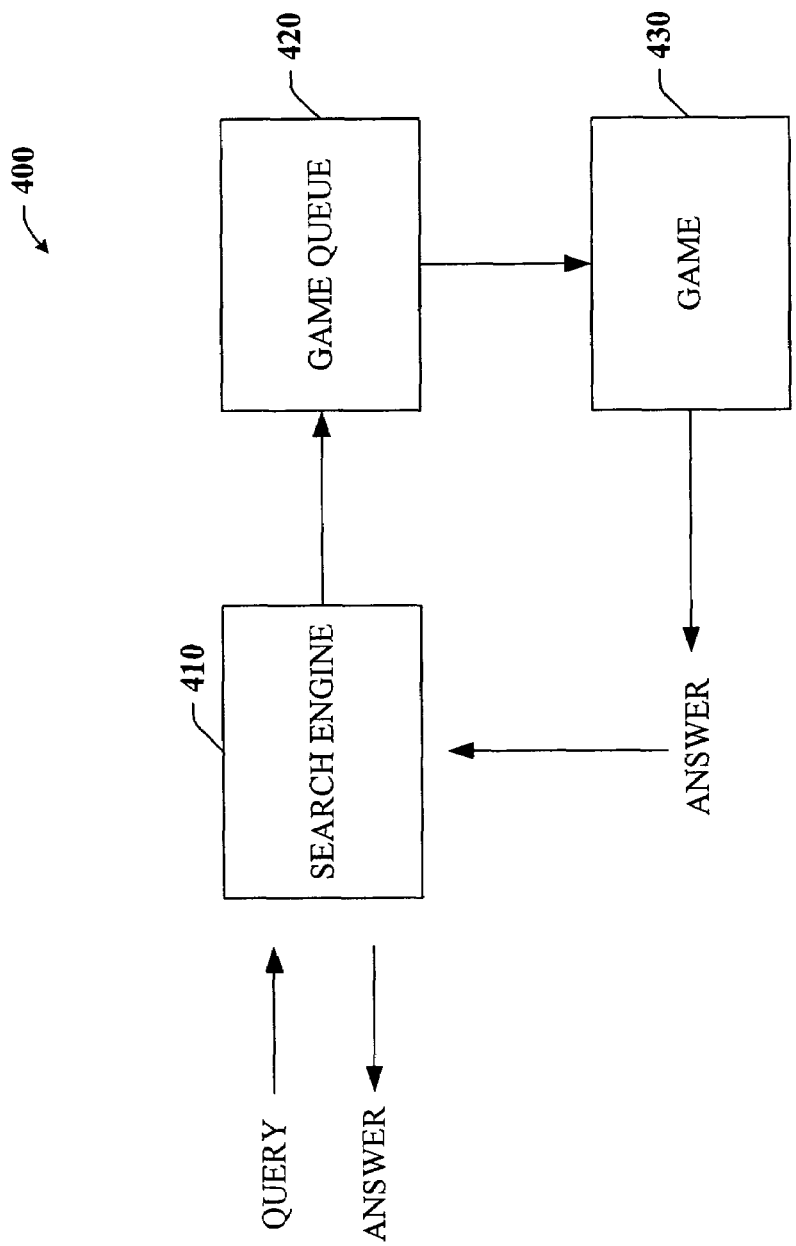
FIG. 4 is a block diagram of an exemplary architecture of a game-powered search system in accordance with an aspect of the subject invention.

Referring now to FIG. 4, there is a block diagram of a multi-player game-power search system 400 that facilitates providing feedback to a user while earning rewards for doing so. According to the system 400, a query can be entered into a search engine 410 by a user. Following, the query can enter into a game queue 420. When the query is taken off the queue 420, it enters the game 430 and is presented to at least two game participants. The game participants are then requested to respond to the query. When the two participants agree on the answer or provide the same or similar answer independently of each other, the agreed upon answer to the query can be returned to the search engine 410 and to the user.

The various systems as discussed hereinabove can be employed in a variety of gaming or non-gaming scenarios. For example, any of the above systems can be used in a user-webcam or other type of game wherein the actions or movements of the user or the player, respectively, are monitored and viewable by others who can then provide input as to what action the user or the player should take. For example, imagine that the user is picking an outfit to wear for a first date and lays out 10 choices. The user may wait for the viewing audience to decide which outfit to wear. Alternatively, the player may be walking down a hall in a castle in a fantasy-like setting. The player's nemesis may be hiding behind a door along the hall, but before the player can proceed, he/she can ask the viewing audience to determine in which direction to proceed or which door to open. When viewers provide their opinions, the most common opinion can be ultimately communicated to the user or player.

Various methodologies in accordance with the subject invention will now be described via a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 5:
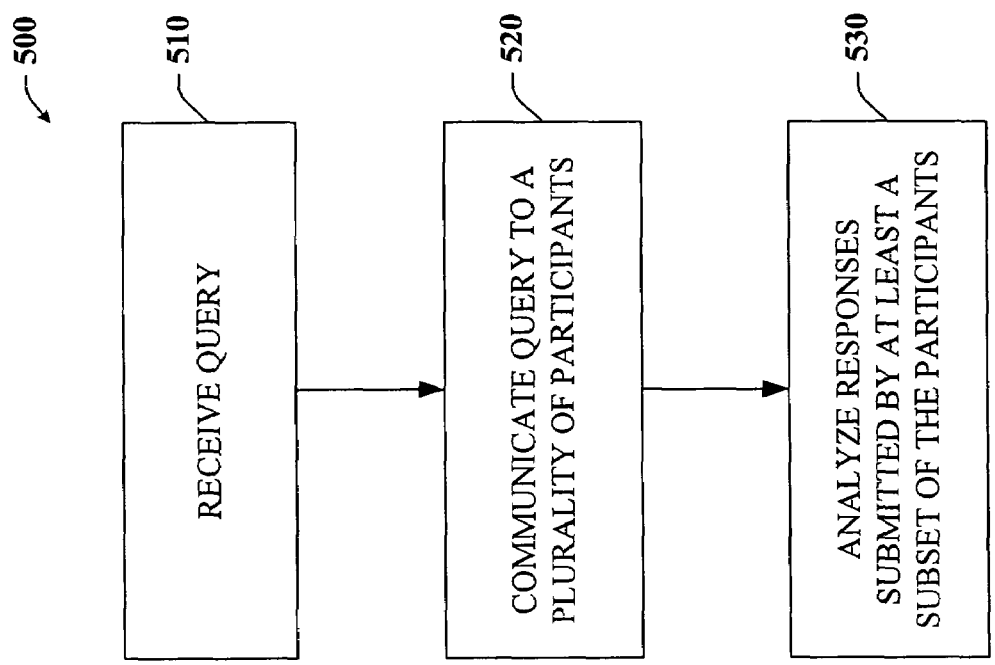
FIG. 5 is a flow chart illustrating an exemplary methodology that facilitates returning a result to a search request or query based on agreement between multi-participant feedback in accordance with an aspect of the subject invention.

Referring now to FIG. 5, there is a flow diagram of an exemplary process 500 that facilitates providing information in response to a user's search request or query in a game-like setting. The process 500 includes receiving a text-based query from a user at 510 who may be looking for information or advice. The query can be composed in the form of a question, statement, or phrase. At 520, the query can be communicated to a plurality of participants who can have the opportunity to respond to the query. Participants' responses can be collected and then analyzed at 530 for suitability. Ultimately, a response can be returned to the user that most likely satisfies his/her query.

Figure 6:
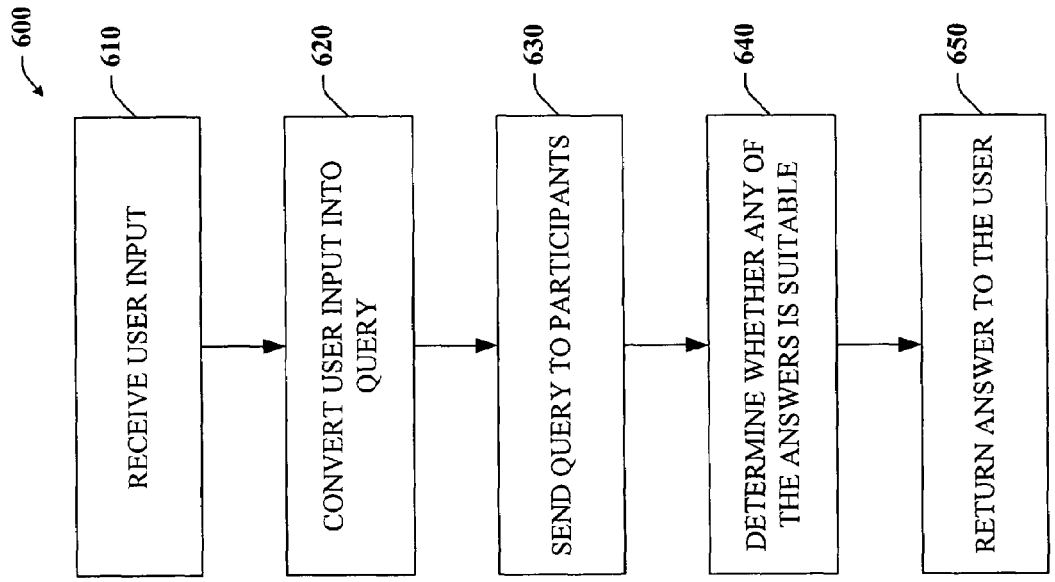
FIG. 6 is a flow chart illustrating an exemplary methodology that facilitates returning a result to a search request or query based on agreement between multi-participant feedback in accordance with an aspect of the subject invention.

Turning to FIG. 6, there is a flow diagram of an exemplary game-powered search process 600 in accordance with an aspect of the subject invention. The process 600 involves receiving user input at 610. The user's input can also be filtered for inappropriate content. When detected, a message can be sent to the user, informing him/her that the content is unsuitable for the search process 600 to process.

Assuming that the input is suitable, the user's input can be converted into a query at 620 that is suitable for a search engine to process and for participants to respond. At 630, the query can be sent to the participants. When at least a subset of the participants has responded to the query, a determination can be made as to whether any of the submitted responses is suitable at 640. For example, when two participants submit a response and both responses are consistent or the same, then that response can be returned to the user at 650. However, when more than two responses are submitted, a probability can be computed for each response as an indication of its apparent accuracy. When the probability satisfies a threshold, the corresponding response can be returned to the user.

Figure 7:
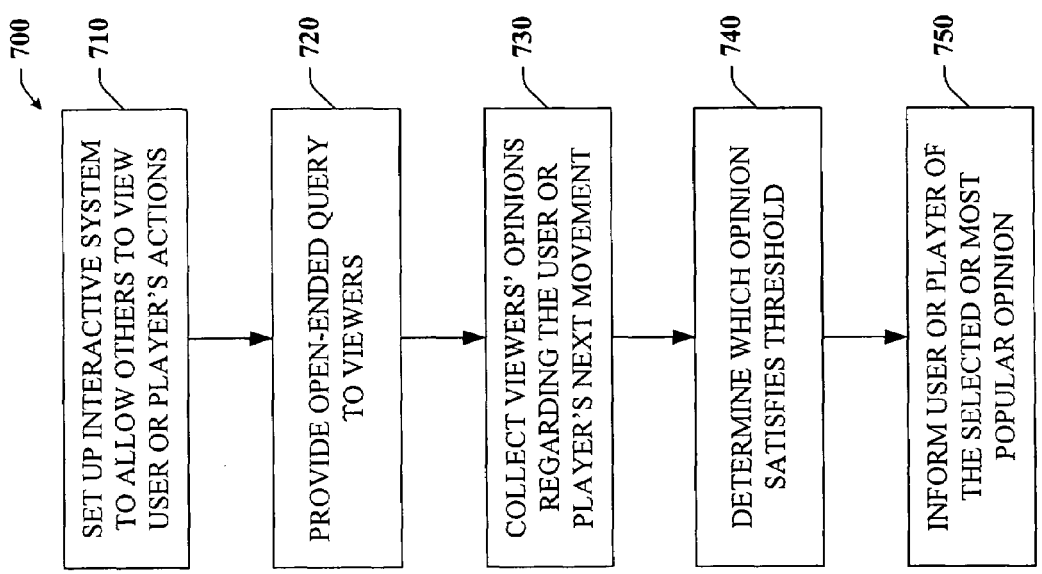
FIG. 7 is a flow chart illustrating an exemplary methodology that facilitates providing an interactive game-powered search process in accordance with an aspect of the subject invention.

In FIG. 7, there is illustrated a flow diagram of an exemplary multi-player game-powered process 700 in which a user can request feedback from a viewing audience of participants in accordance with an aspect of the subject invention. The process 700 involves setting up an interactive system at 710 to allow others to view or observe the user's movements or actions either in a game-like setting (e.g., the user is playing a game and needs direction and advice from others watching him/her in order to proceed through the game) or a real-time life-based setting (e.g., user has allowed others to view him/her by way of a webcam and takes direction, advice and guidance from those watching him/her through the webcam.

At 720, the user can post or send out an open-ended query such as "tell me what to do or where to go" or "watch me and give me advice". At 730, the viewers' opinions can be collected. The opinions can be in the nature of "open the door", "jump in the water", "wear the purple sweater", etc. The types of content associated with the process 700 are virtually limitless. At 740, the opinions are examined to determine the most suitable one to return to the user. The viewers can be given a time limit in which to provide their respective opinions or responses. In this scenario, rewards can be earned when the movement or action chosen to be returned to the user belongs to the viewer. The rewards can be in the form of discounts, services, money, and the like. At 750, the user can be given the most appropriate or selected feedback or opinion based on the viewers that responded to the query.

Figure 8:
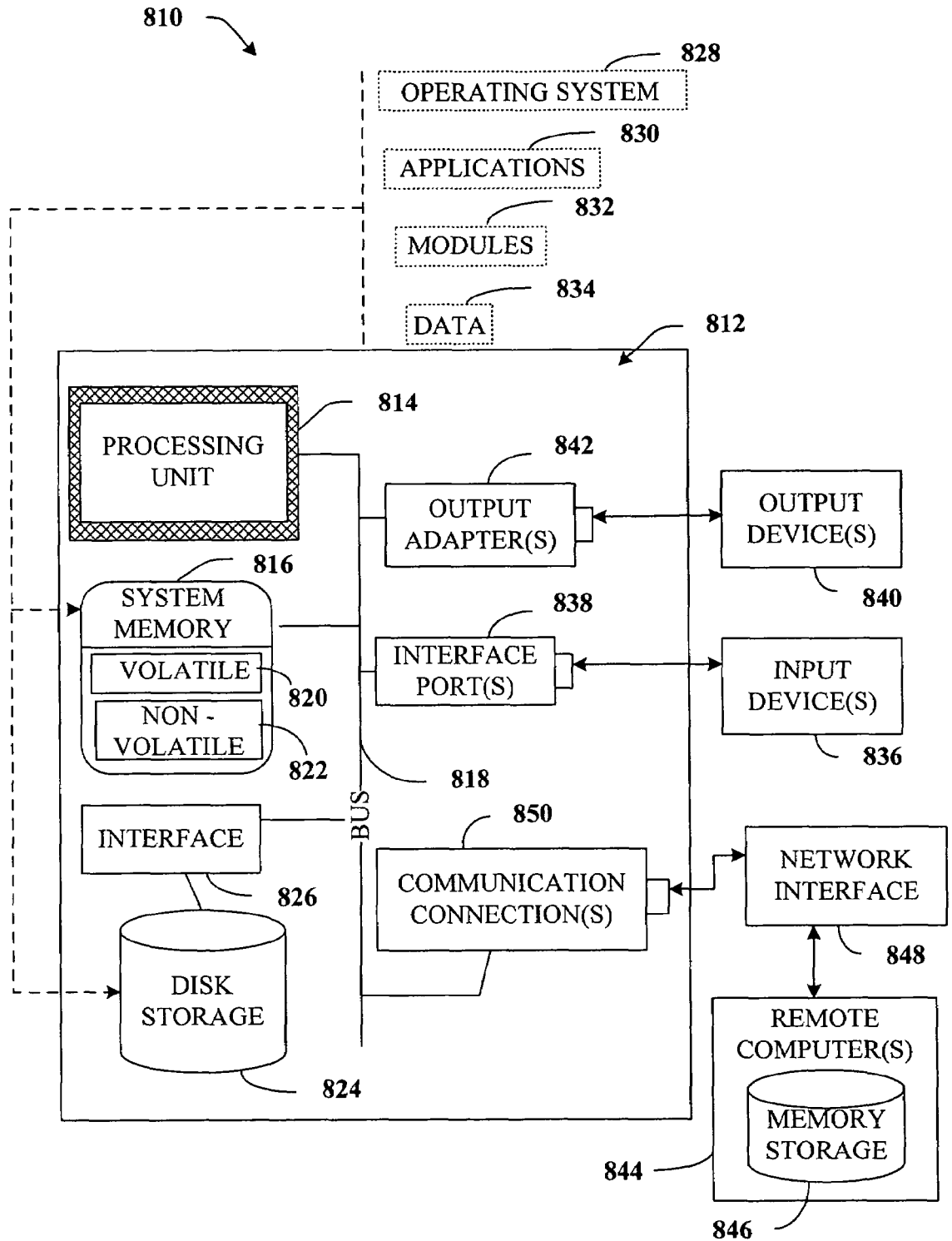
FIG. 8 illustrates an exemplary environment for implementing various aspects of the invention.

In order to provide additional context for various aspects of the subject invention, FIG. 8 and the following discussion are intended to provide a brief, general description of a suitable operating environment 810 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 810 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the subject invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5, and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented game-powered searching system comprising:
    a query component that collects a query from a user via a search engine, the query component automatically forwards the query to a plurality of game participants;
    a receive component that obtains one or more responses to the query, the one or more responses obtained contemporaneously from the plurality of game participants, the game rewards game participants for suitable responses;
    an analysis component that determines whether at least one subset of the responses represent suitable answers to the query, the analysis component analyzes the one or more responses to establish a level of agreement between the one or more responses, the level of agreement depends upon a degree of similarity among the one or more responses, the subset of responses deemed suitable comprises responses having a level of agreement between one another that is above a threshold;
    a reward component that provides rewards to game participants offering responses included in the subset of responses deemed suitable; and
    memory storage that retains the query component, the receive component, the analysis component, the reward component or a combination thereof.

2. The computer-implemented system of claim 1, further comprising a query queue that retains one or more queries from a user.

3. The computer-implemented system of claim 1, the one or more queries comprise at least one of user-initiated search strings or search strings derived therefrom.

4. The computer-implemented system of claim 1, the level of agreement comprises a probability that the one or more responses are correct.

5. The computer-implemented system of claim 1, a query return component that returns the subset of suitable responses back to the user who initiated the query when the probability satisfies the threshold.

6. The computer-implemented system of claim 1, further comprising additional test queries with known answers being submitted to the plurality of game participants.

7. The computer-implemented system of claim 6, the analysis component analyzes previous responses plurality of game participants to past queries.

8. The system of claim 1, the one or more responses comprise a universal resource locator to a resource that provides a detailed answer to the query.

9. The system of claim 1, the analysis component identifies at least two subsets of responses representing suitable answers to the query, wherein the at least two subsets of responses are returned to the user.

10. A computer-implemented interactive game-powered feedback system comprising:
    a monitoring component that allows a plurality of viewers to watch movements of a user in a game;
    a feedback component that contemporaneously collects a set of viewer responses to the movements, the set of responses relate to a suggested subsequent movement, the feedback component analyzes the set of viewer responses to determine at least a subset of responses to return to the user to facilitate directing a subsequent movement of the user, the feedback component determines the subset of responses that comprises responses from the set of responses having a level of agreement above a threshold with respect to all members of the subset, the level of agreement relates to a degree of similarity among the responses;
    a reward component that provides rewards to viewers that offer responses relating to a subsequent movement ultimately taken by the user in the game; and
    memory storage that retains the monitoring component, the feedback component or a combination thereof.

11. The computer-implemented system of claim 10, further comprising a return component that returns the subset of responses to the user.

12. A game-powered search method comprising:
    obtaining one or more queries from a user through a search engine;
    adding the obtained one or more queries to a query queue;
    filtering the one or more queries to determine if the queries include inappropriate content, inappropriate content comprises specific words or phrases on a block list;
    removing queries with inappropriate content from the query queue;
    selecting a query from the query queue;

parsing the selected query for content to determine a subject matter category;

presenting the selected query to a subset of a plurality of game participants to solicit a set of responses from the the subset of game participants, the subset of game participants corresponds to a specialized group of participants that possess exceptional knowledge of the subject matter category;

receiving the set of responses from the subset of game participants;

determining whether at least a portion of the set of responses received from the subset of participants have a level of agreement therebetween that is above a threshold; returning to the user at least one of:

the portion of the set of responses if the level of agreement exceeds the threshold; or a notification that no suitable responses were received from the participants if the level of agreement does not exceed the threshold;

monitoring a reaction of the user to the returned information; and rewarding participants providing a response included in the portion of the set of responses if the portion of responses are returned to the user.

13. The method of claim 12, further comprising receiving user input and converting the user input into the one or more queries.

14. The method of claim 13, the one or more queries comprise at least one of user-initiated search strings and search strings derived therefrom.

15. The method of claim 12, further comprising additional test queries with known answers being submitted to the plurality of game participants.

16. The method of claim 15, further comprising analyzing the participants' responses to past queries.

17. The method of claim 16, further comprising returning the subset of responses back to the user who initiated the query when the probability satisfies the threshold.

18. The method of claim 12, further comprising watching the user's movements in a game-like environment and telling the user what action to perform or what movement to make.

19. The method of claim 12, further comprising rewarding participants with an additional reward if user behavior derived from the monitoring indicates increased satisfaction with responses.

20. The method of claim 12, further comprising storing returned responses and the corresponding queries for future reference or later retrieval.

* * * * *